Nov. 3, 1959

S. T. CARTER 2,911,089

ARTICLE-ORIENTING MEANS FOR USE IN CONVEYOR
APPARATUS HAVING A ROTARY SPACER SCREW

Filed May 28, 1958

INVENTOR.
Sidney T. Carter
BY
Roberts Cushman & Grace
ATT'YS.

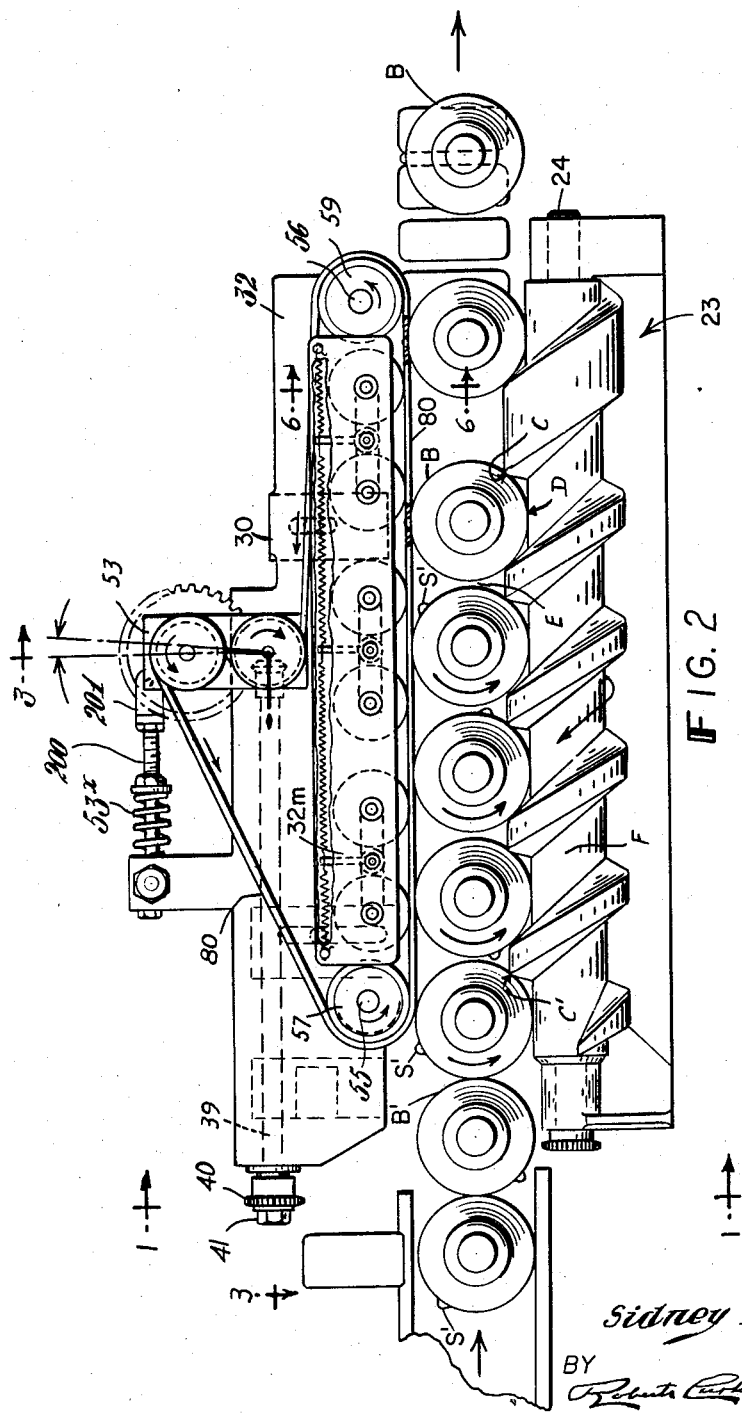

Nov. 3, 1959
S. T. CARTER
2,911,089
ARTICLE-ORIENTING MEANS FOR USE IN CONVEYOR
APPARATUS HAVING A ROTARY SPACER SCREW
Filed May 28, 1958
9 Sheets-Sheet 3
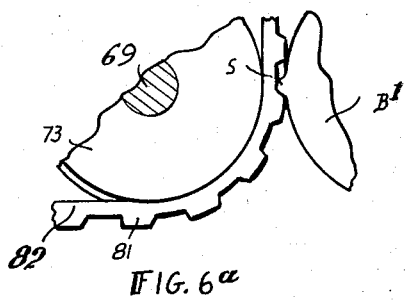
FIG. 6ᵃ
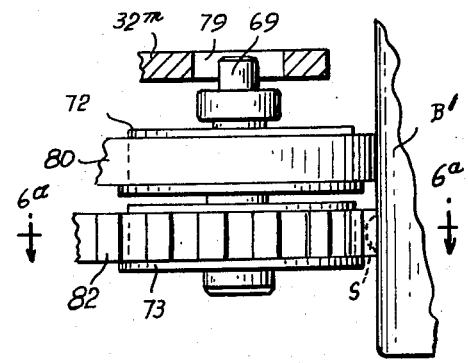
FIG. 6
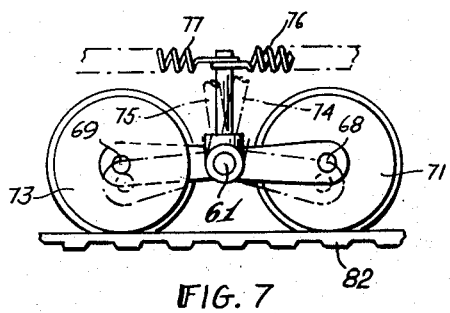
FIG. 7
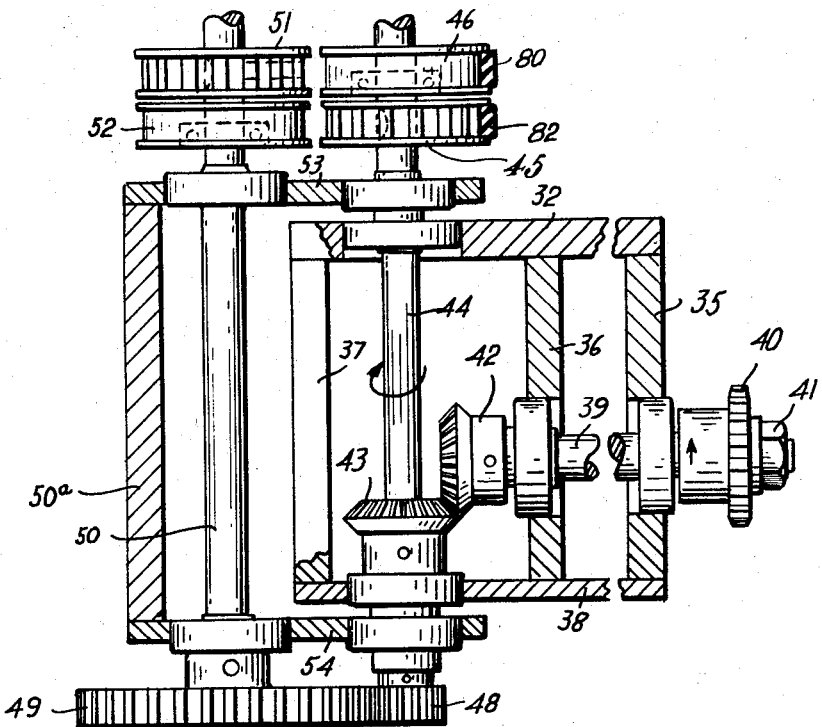
FIG. 3
INVENTOR
Sidney T. Carter
BY
ATT'YS

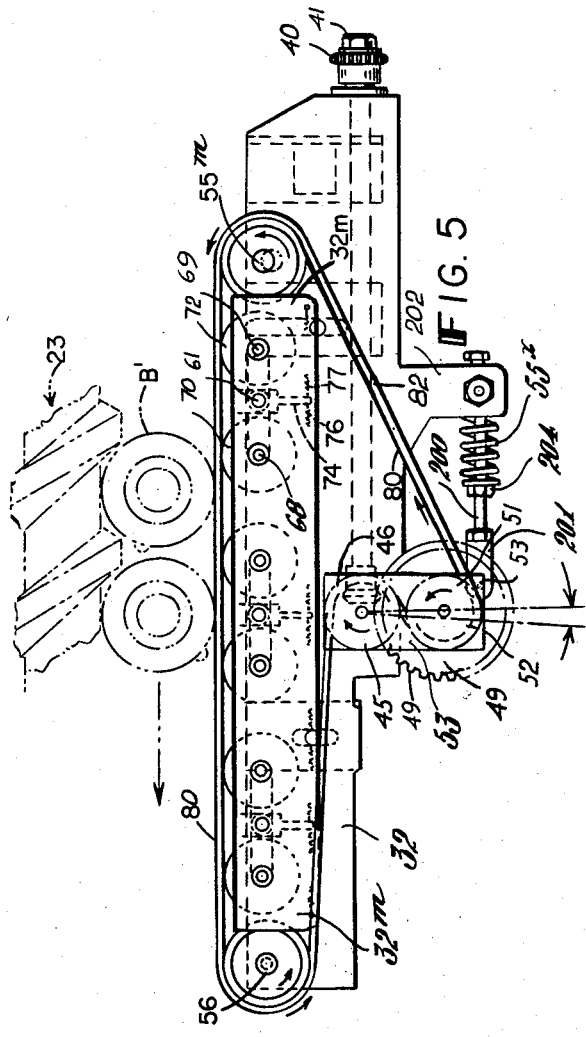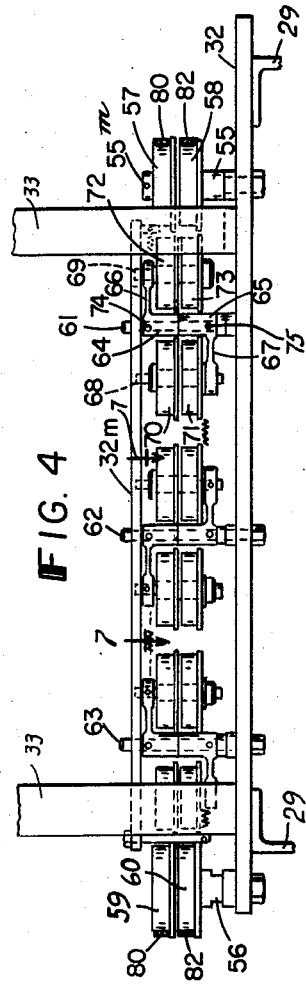

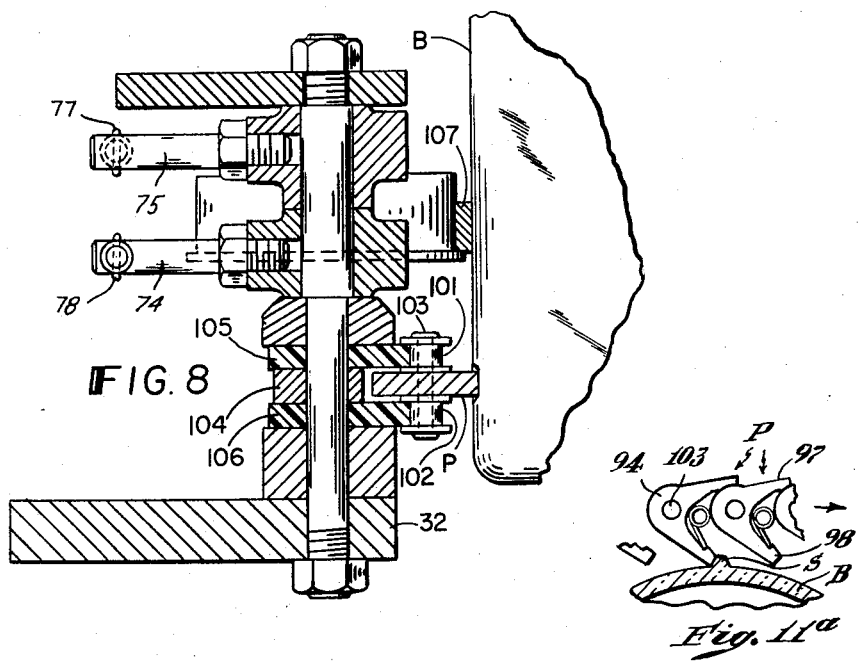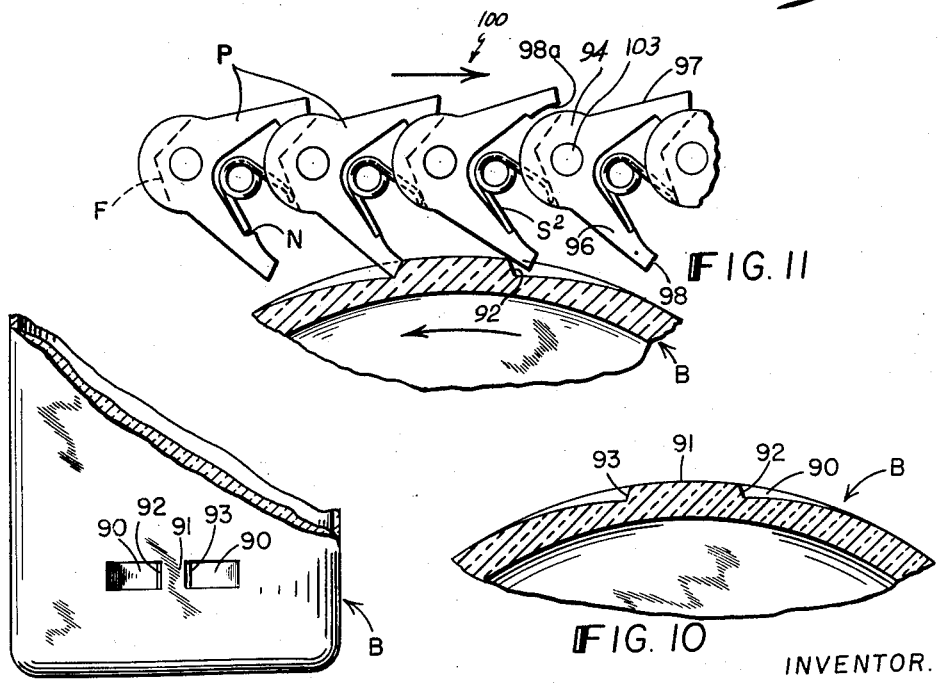

INVENTOR
Sidney T. Carter
BY
ATT'YS.

Nov. 3, 1959 S. T. CARTER 2,911,089
ARTICLE-ORIENTING MEANS FOR USE IN CONVEYOR
APPARATUS HAVING A ROTARY SPACER SCREW
Filed May 28, 1958 9 Sheets-Sheet 9
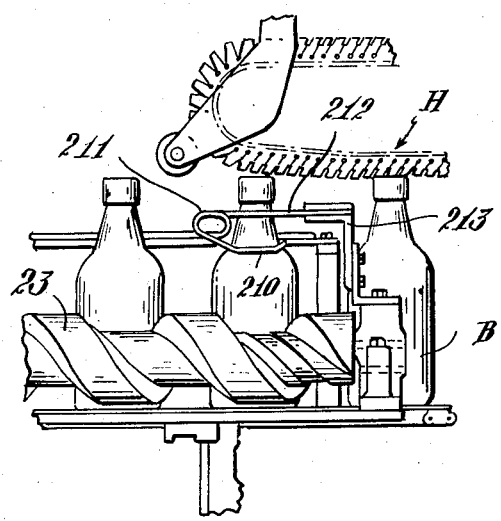
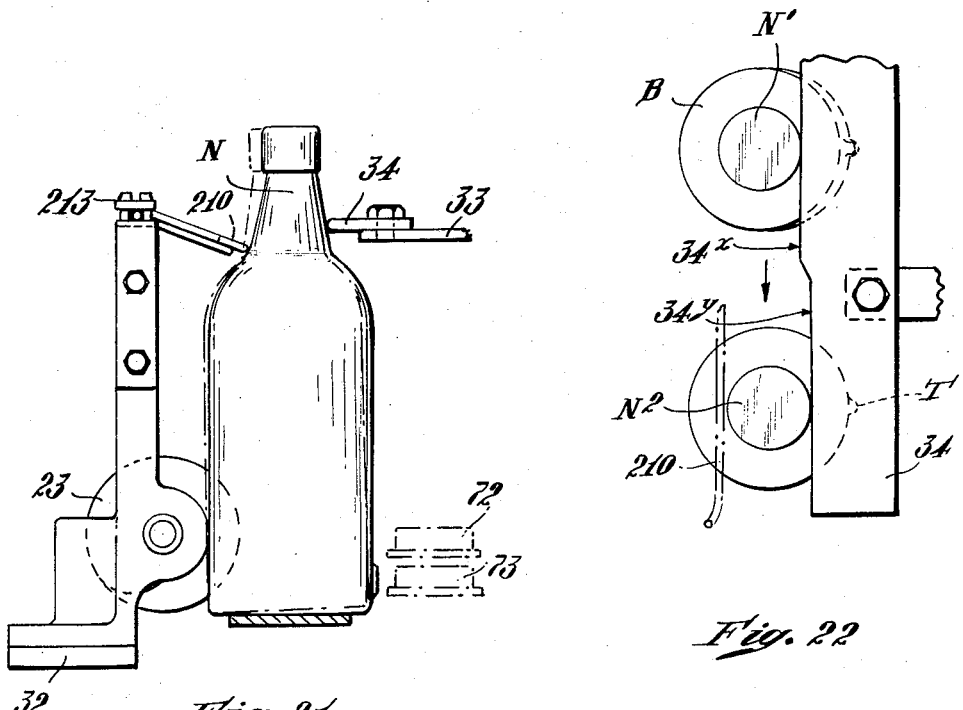
Inventor
Sidney T. Carter

United States Patent Office 2,911,089
Patented Nov. 3, 1959

2,911,089

ARTICLE-ORIENTING MEANS FOR USE IN CONVEYOR APPARATUS HAVING A ROTARY SPACER SCREW

Sidney T. Carter, Shrewsbury, Mass., assignor to Geo. J. Meyer Manufacturing Co., Cudahy, Wis., a corporation of Wisconsin Application May 28, 1958, Serial No. 738,427

44 Claims. (Cl. 198—33)

This invention pertains to article-spotting means for use in apparatus of the kind wherein articles are moved uninterruptedly along a rectilinear path by conveyor means and are maintained in accurately spaced relation by a rotating screw whose axis is parallel to the conveyor path, and relates more especially to novel and improved means for orienting each article about its vertical axis while the article is engaged by the spacer screw thereby accurately positioning a spotting element on the article preparatory to its delivery to a processing device, for instance label-affixing means.

In apparatus designed to move articles uninterruptedly along a rectilinear path at high linear velocity, for example at a rate of 300 articles per minute past a given point, for instance in presenting articles to a high speed label-applying device, it has been found highly desirable to employ a rigid helix or screw for spacing the articles accurately just before they reach the label-applying means; and, since it is often required that the label be applied at a predetermined area of the surface of the article, it is likewise necessary to provide means for spotting the article (that is to say, orienting it about its vertical axis) to present said predetermined area of the article in accurate position to receive the label.

The embodiment of the present invention, herein chosen for illustration, is a self-contained unit such that it may be applied to or removed from existing machines without difficulty.

Spotting elements of various kinds are in common use, for example the spotting element may be a small, integral nub commonly referred to as a "tear drop" projecting from the periphery of a bottle, or it may be a wall of a small cavity or depression in the article which is to be spotted, said wall being inside the periphery of the article and being termed a "depressed spotting bar."

An object of the present invention is to provide spotting means useful in apparatus of the type wherein a rotary, rigid spacer screw is employed, and which is capable of spotting articles accurately while they are in contact with the screw and are moving uninterruptedly along the conveyor path at high speed. A further object is to provide spotting means having the capabilities just above described and which is embodied in a unitary structure such that it may be applied quickly and easily to existing conveyor apparatus without necessitating any substantial modification of the latter.

A further object of the invention is to provide spotting apparatus particularly designed for use with the first of the above-described types of spotting elements, that is to say, the tear-drop type. A further object is to provide spotting means for use with spotting elements of either the first of the second type, that is to say, either the tear-drop or the depressed bar type, and which is operative, by contact with the spotting element, to exert a positive force such as to hold the article in spotted position; but, which in the event of a jam, automatically retracts therefrom to avoid a smash. A further object is to provide spotting means for use in apparatus wherein a conveyor and rigid spacer screw are associated and which is so designed that the screw tends to retard rotation of an article as the latter is moved along by the conveyor so that each article always makes contact at one point with the forward wall of the helical groove of the screw while it concomitantly makes contact at another point of its periphery with the bottom of the groove and wherein the screw is of such a pitch that successive articles are spaced sufficiently to prevent a spotting projection on one article from contacting the spotting element of an adjacent article. A further object is to provide means whereby the area of surface contact of the article with the conveyor is reduced, while the article is being oriented, thereby to facilitate its rotation, and means operative to insure the proper centering of the article transversely of the conveyor path and the verticality of its axis as it leaves the screw. A further object is to provide spotting means having the above characteristics and including appropriate adjusting means to adapt the apparatus for use with articles of different sizes and to keep the various operating elements in optimum condition for effective cooperation with the other parts and with the articles which are to be spotted.

Other and further objects and advantages of the invention will be pointed out in the following more detailed description and by reference to the accompanying drawings wherein:

Fig. 2 is a fragmentary plan view, showing spotting means according to the present invention interposed between two aligned conveyor runs, the arrangement being especially designed for spotting bottles provided with spotting elements of tear-drop type;

Fig. 3 is a fragmentary vertical section, with parts broken away, to larger scale, substantially in the plane of the line 3—3, Fig. 2, but omitting the conveyor and spacer screw;

Fig. 4 is a fragmentary rear elevation (looking toward the spacer screw, but omitting the latter) showing a portion of the frame of the spotting means, and means for driving and guiding the endless belts;

Fig. 5 is a plan view of parts shown in Fig. 4, but showing (in broken lines) the spacer screw and two adjacent bottles;

Fig. 6 is a fragmentary vertical section to larger scale, substantially on the line 6—6 of Fig. 2;

Figure 12:
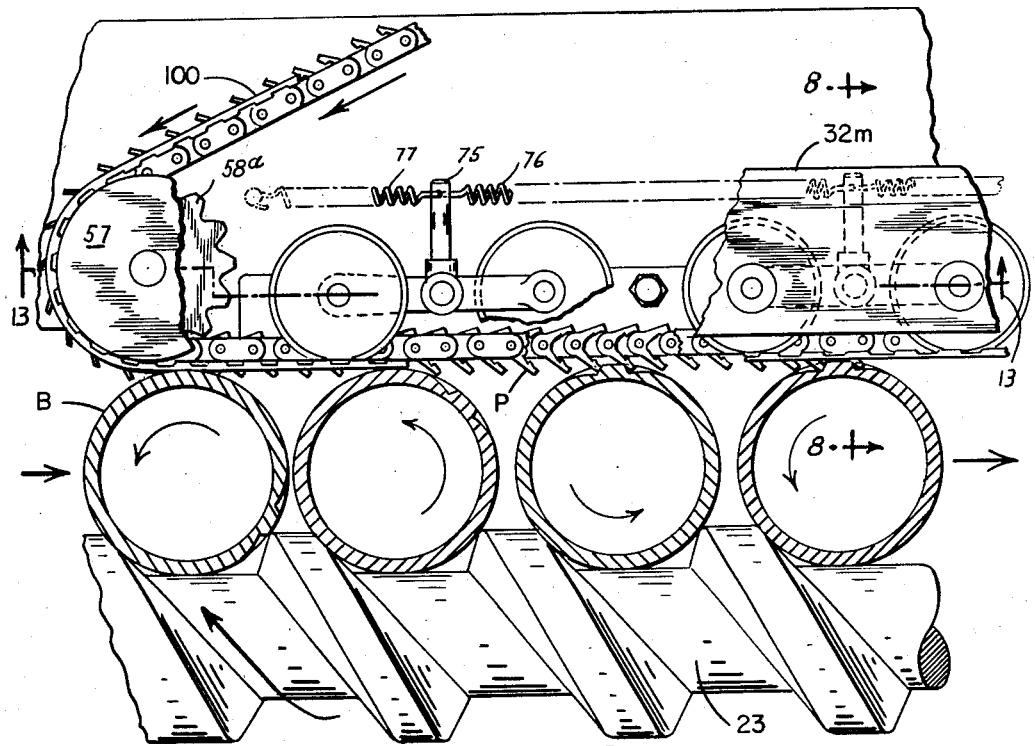
Figure 13:
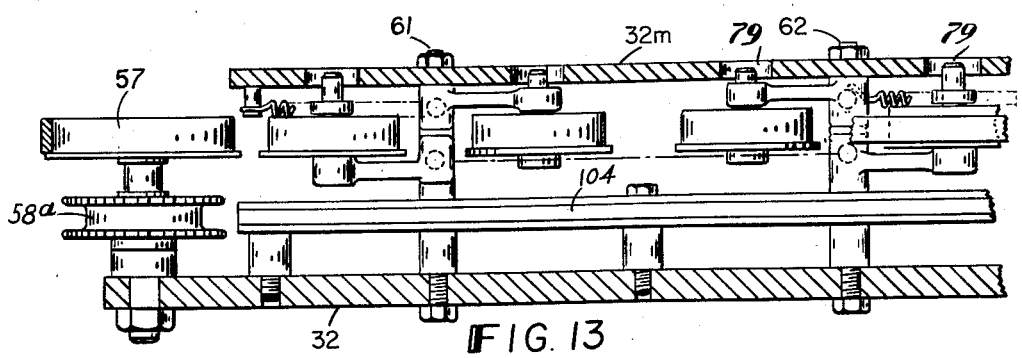
Figure 14:
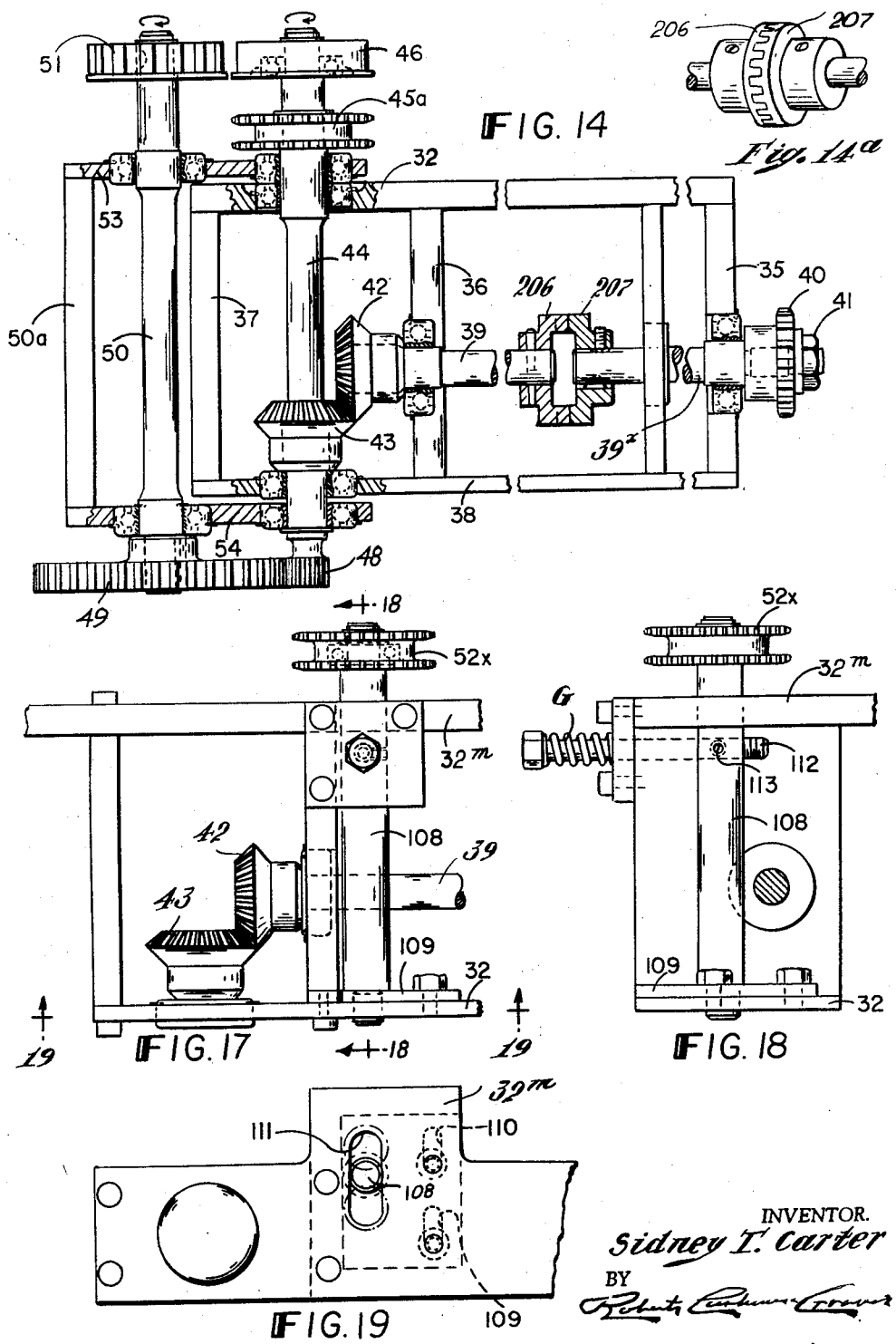
Figure 15:
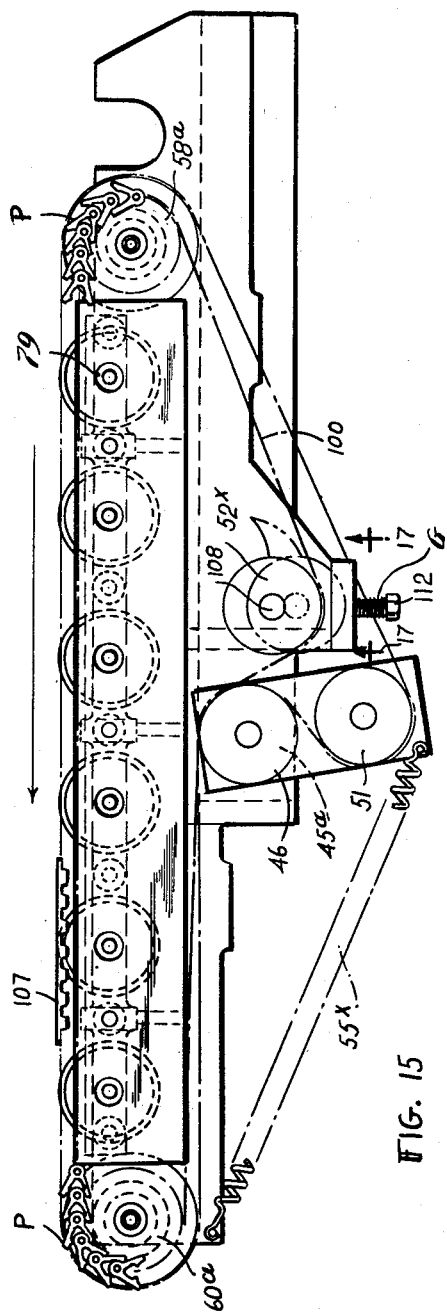

Fig. 6ª is a fragmentary horizontal section on the line 6ª—6ª of Fig. 6;

Fig. 7 is a fragmentary plan view, to larger scale than Fig. 5, showing a single set of belt-guiding pulleys;

Fig. 8 is a view similar to Fig. 6, but showing a modified arrangement for use with a spotting element of the depressed bar type;

Fig. 9 is a fragmentary side elevation of a bottle showing a spotting element of the latter type;

Fig. 10 is a fragmentary horizontal section (to larger scale) through a bottle having a spotting element of the depressed bar type;

Fig. 11 is a fragmentary horizontal section, similar to Fig. 10, but showing a portion of the novel spotting chain with one of its pawls operatively engaging the depressed bar spotting element;

Fig. 11ª is a fragmentary section, similar to Fig. 11, but showing the spotting chain with one of its pawls engaging a spotting projection of tear-drop type;

Fig. 12 is a fragmentary plan view, similar to Fig. 2, but showing the novel chain, instead of a belt, as constituting the spotting device, the chain-driving means being omitted;

Fig. 13 is a vertical section substantially on the line 13—13 of Fig. 12;

Fig. 14 is a view similar to Fig. 3, but showing means for driving the spotting chain of Fig. 12 together with modified means for timing the spotting means relatively to the spacer screw;

Fig. 14ª is a fragmentary perspective view showing a clutch device useful in adjusting the relative timing of the spotting chain and the spacer screw;

Fig. 15 is a diagrammatic plan view, similar to Fig. 2, but showing the means for guiding and tensioning the spotting chain, but omitting the spacer screw and conveyor.

Figure 16:
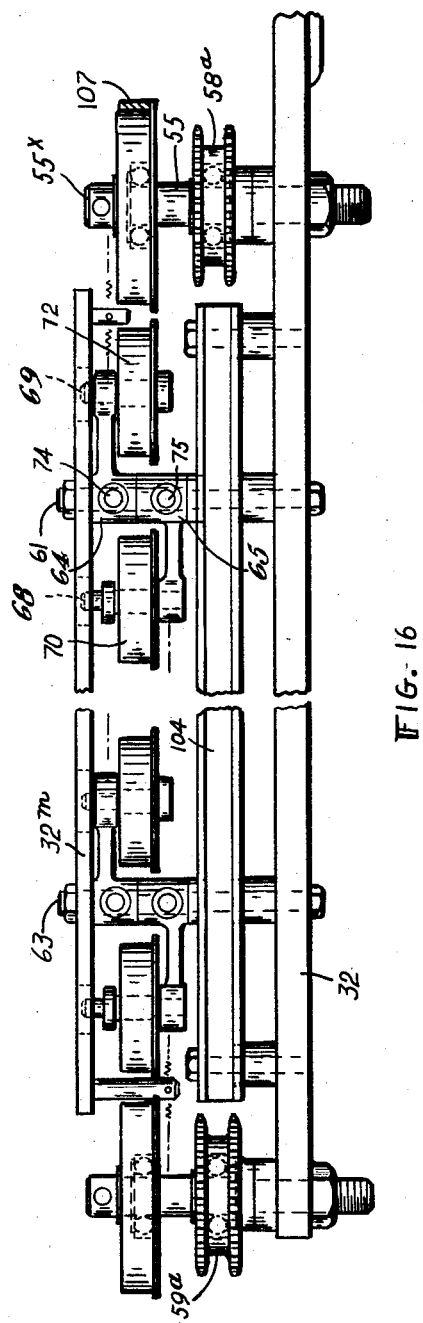

Fig. 16 is a fragmentary elevation, to larger scale, omitting certain parts but showing the inner side of the device of Fig. 15, that is to say, the side which is adjacent to the spacer screw;

Fig. 17 is a fragmentary elevation showing means for adjusting the tension of the pawl-carrying chain, independently of the associated belt;

Fig. 18 is a fragmentary vertical section, substantially on the plane of line 18—18 (Fig. 17);

Fig. 19 is a fragmentary horizontal section, substantially on the line 19—19 of Fig. 17, and omitting certain parts;

Fig. 20 is a fragmentary elevation showing the delivery end portion of the spacer screw, the receiving end portion of the endless hold-down device, and a device which, by engagement with the bottle, applies retarding effect such as to straighten up a bottle which leans forward in approaching the hold-down;

Fig. 21 is a fragmentary elevation, in a vertical plane at right angles to the conveyor, illustrating the relation to the neck guide bar to the retarding device; and Fig. 22 is a fragmentary plan view of parts shown in Fig. 21.

Figure 1:
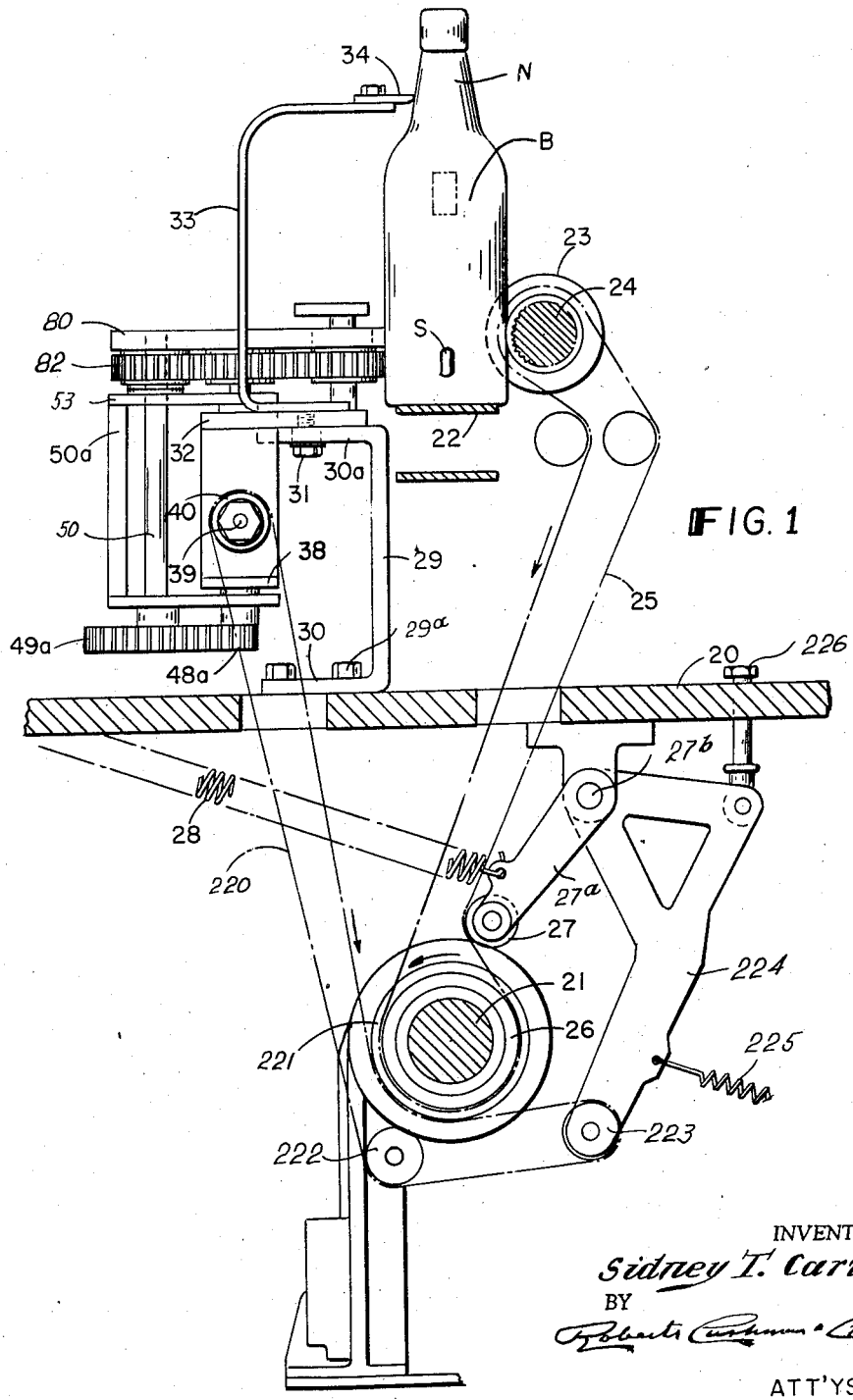
Fig. 1 is a fragmentary, somewhat diagrammatic transverse vertical section, substantially in the plane of line 1—1 (Fig. 2) illustrative of conveyor apparatus embodying the present invention.

Referring to the drawings, and particularly to Fig. 1, the numeral 20 designates the table of a conveying apparatus of the kind in which a rigid rotating article-spacing screw is arranged at one side of the article path for accurately controlling the spacing and speed of advance of the articles toward the field of action of some processing device, for instance label-applying means.

The horizontal main shaft 21, below the table, is driven by appropriate means (not shown) so as to make one revolution for each cycle of operation of the apparatus, and from this main shaft most of the operative parts of the mechanism receive their motion. The frame of the machine supports an endless conveyor which may be of conventional type, having the upper horizontal run 22 on which articles B, to be processed, rest while moving along the rectilinear conveyor path. Merely by way of example, but without limitation, such articles are here illustrated and referred to in the following description as "bottles," one such bottle B being shown as resting on the conveyor run 22. The bottle shown has a circular body portion and a neck N and has a spotting element S spaced a short distance above its bottom and which, as shown in Fig. 1, is an integral projection or "tear-drop."

The article-spacing and feeding screw 23 (Figs. 1 and 2) is mounted on a shaft 24 whose axis is parallel to the conveyor path and at one side of the latter, near the article-receiving or feed end of the apparatus. The shaft 24 is driven by a sprocket chain 25 (Fig. 1) passing about a sprocket 26 fixed to the main shaft and is held under proper tension by an idler sprocket 27 which is urged toward the chain by a spring 28, carried by an arm 27ª, pivoted on a shaft 27ᵇ and supported by a bracket fixed to the table 20.

In accordance with the present invention, article-orienting or spotting means cooperable with the spotting element S upon the article is provided in the form of a self-contained unit which may be applied to the table of any existing or new machine at the opposite side of the article path from the screw 23 and in such position (lengthwise of the conveyor path) that the article will still be under control of the spacing screw while being oriented to the proper position.

As illustrated in Figs. 1 and 4, this spotting unit is carried by one or more supporting brackets such as the bracket 29 (each having a horizontal foot 30, Fig. 1, which is fixed to the table 20 by bolts 29ª). Each such bracket has a horizontal flange 30ª at its top and each such top flange has elongate slots (shown in dotted lines in Figs. 2 and 5) for the reception of bolts 31 whereby the frame proper of the spotting unit is connected to the bracket or brackets 29.

As illustrated in Fig. 1, the frame of the spotting unit comprises a horizontal top plate 32 resting upon the top flanges 30ª of the brackets 29 and which is approximately the same length as the spacer screw 23 and which is located at the opposite or rear side of the conveyor path from the screw.

Because of the elongate slots which receive bolts 31 and which extend at right angles to the conveyor path, the frame of the spotting unit may be adjusted toward or from the conveyor path to accommodate bottles of different diameters.

The plate 32 supports brackets 33 (Fig. 1) which carry the elevated horizontal neck-guiding bar 34 (Figs. 1, 21 and 22 but not shown in Fig. 2) parallel to the conveyor and extending the entire length of the spotting unit and whose inner edge contacts the bottle necks. The function of this bar 34 will be presently described.

The plate 32 forms the upper member of the main frame of the spotting unit, this frame (Fig. 3) also comprising vertical members 35, 36 and 37 and the horizontal bottom member 38. The members 35 and 36 have bearings for a horizontal shaft 39. A sprocket 40 is mounted on one end of the shaft 39. An endless sprocket chain 220 (Fig. 1) embraces the sprocket 40, one run of this chain partially wrapping a sprocket 221 fixed to the main shaft 21, while another run of this chain partially wraps an idler sprocket 222 mounted on a stub shaft supported by a part of the frame of the spotting device. This chain also embraces an idler sprocket 223 on a stub shaft carried by one arm of a lever 224 pivoted on the same shaft 27ᵇ, which carries the arm 27ª. A spring 225 tends to swing the arm 224 in a counterclockwise direction (Fig. 1), and an adjustable stop 226 limits such motion. The lever 224, when properly adjusted, holds the chain 220 suitably tensioned for driving the sprocket 40.

In accordance with one arrangement, the sprocket 40 is not keyed to the shaft but is normally fixed to the shaft by clamping means, for example a nut 41, so devised that the sprocket may be rotatably adjusted about the axis of the shaft in order to place the sprocket in proper time with the screw 23. A beveled gear 42 is keyed to the opposite end of shaft 39 and meshes with a beveled gear 43 keyed to a vertical shaft 44 turning in bearings in the plates 32 and 38, and having keyed to its upper end (above the plate 32) a belt-driving pulley 45 provided with suitable elements to insure non-slipping engagement with a toothed belt hereafter described. An untoothed idler pulley 46 is mounted to turn freely on the shaft 44 above the pulley 45. To the lower end of shaft 44, there is fixed a spur pinion 48 which meshes with a gear 49 keyed to the lower end of the shaft 50 to whose upper end a toothed belt-driving pulley 51 is keyed. An untoothed belt-tensioning pulley 52 is arranged to turn freely on the shaft 50 just below the drive pulley 51. The bearings for shaft 50 are carried by a rigid frame comprising a rigid, vertical plate 50ª and vertically spaced horizontal arms 53 and 54 which have bearings, desirably of anti-friction type, for the reception of the shaft 44 so that the frame, carrying the shaft 50, may swing in an arc about the axis of the shaft 44. A spring 55ˣ (Fig. 2) tends to swing this frame in a clockwise direction thereby to tension the belts which embrace pulleys 51 and 52. As illustrated in Figs. 2 and 5, the spring 55ˣ is of open-coil compression type, encircling a rod 200, having at one end a fork 201 which engages the edge of vertical plate 50ᵃ and whose other end portion slides freely in an opening in a bracket depending from a part 202 of the plate 32. A nut 203, having screw-threaded engagement with rod 200 provides for adjusting the spring and thus the force tending to swing the frame in which shaft 50 is mounted, and so varying the tension of the belts which embrace pulleys 51 and 52.

Vertical stub shafts 55 and 56 (Fig. 4) are mounted at opposite ends of the plate 32. Upper and lower belt-guiding pulleys 57 and 58 are mounted to turn freely on the stub shaft 55 and similar belt-guiding pulleys 59 and 60 are mounted to turn freely on the stub shaft 56. Three vertical stub shafts 61, 62 and 63 (Figs. 4 and 5) are fixed at their lower ends in plate 32, these shafts being spaced apart and having their axes in the plane of the axes of stub shafts 55 and 56. Upper and lower sleeves 64 and 65 (Fig. 4) are arranged to turn on the shaft 61, these sleeves having integral, horizontal, radial arms 66 and 67, respectively, which carry vertical stub shafts 69 and 68, respectively. Belt-guiding pulleys 70 and 71 are mounted to turn freely on the shaft 68 and similar belt-guiding pulleys 72 and 73 are arranged to turn freely on the shaft 69. Arms 74 and 75 are fixed to sleeves 64 and 65, respectively. Springs 76 and 77 (Figs. 5 and 7), attached to the arms 74 and 75, respectively, tend to swing these arms in opposite directions about the axis of shaft 61, thus urging the belt-guiding pulleys 70, 71 and 72, 73 toward the conveyor path. It may be noted at this point by reference to Fig. 6 that the belt-engaging faces of the lower pulleys of both pairs are located at the horizontal level of the spotting elements S of the bottles B resting on the conveyor. The upper pulleys of each pair are located slightly above the level of the spotting elements. However, it is contemplated, as within the scope of the invention, if, for example, the spotting elements S are spaced substantially above the bottoms of the bottles, to arrange the pulleys 70 and 72 below the pulleys 71 and 73, respectively. It is to be understood that each of the vertical stub shafts 62 and 63 carries two pairs of belt-guiding pulleys similar to the pulleys 70, 71 and 72, 73 above described, similarly supported and similarly urged toward the conveyor path. As indicated in Fig. 6, the upper end of each of the pulley-supporting shafts 68, 69, etc., is arranged in an opening 79 in a plate 32ᵐ located above and fixed relatively to the plate 32. The dimensions of this slot limit approach of the pulleys toward the conveyor path.

An endless belt 80 (Fig. 5) passes about the upper pulleys 57 and 59 at opposite ends of the spotting unit, and a run of this belt extends substantially parallel to the conveyor path and adjacent to the latter, this run being contacted by the guide pulleys 70, 72, etc., and by said pulleys being urged toward the conveyor path. This belt 80 also engages the idler pulley 46 (Figs. 3 and 5) and the driving pulley 51, desirably contacting each of these pulleys through an arc of at least 180°. This belt has spaced lugs on that face which contacts the drive pulley 51 and the face of the latter pulley is provided with elements, for example spaced recesses, for engagement with these lugs thereby to prevent belt slippage. The smooth surface of this belt 80 contacts the bottles (Fig. 6) as they move along the conveyor path and frictionally turns each bottle about its own vertical axis. Because the bottles are moved along the conveyor path by the conveyor, the belt 80 may be driven at relatively low linear velocity (the pinion 48 and gear 49, Fig. 3, providing such a low speed ratio). However, even if the belt 80 be stationary, sufficient rotation of the bottles is usually attained and thus it is contemplated that, by elimination of the drive for the belt 80, a reduction in cost of the apparatus may be secured without substantial loss of functional utility.

A second endless belt 82 (Figs. 3, 5, 6 and 6ᵃ) embraces the lower idler pulleys 58 and 60; contacts the lower guide pulleys 71, 73, etc.; and contacts a substantial arc of the circumference of the drive pulley 45 (Fig. 3) and the idler tensioning pulley 52. This belt 82 is of the same type as the belt 80 but has its lugs 81 (Figs. 6 and 6ᵃ) on that side which is next to the conveyor path so that its lugs are in position to engage the spotting elements S on the bottles. That side of the belt 82 which has the lugs 81 contacts the drive pulley 45 and the latter is provided with suitable elements, for example spaced recesses, for engagement with these lugs of the belt thereby to drive the belt at predetermined speed without slippage. Belts and pulleys of this type are well-known.

It will thus be noted that the smooth side of belt 80 contacts the upper idler pulley 46 while the toothed side of the belt engages the driving pulley 51; while the toothed side of the lower belt 82 contacts the toothed drive pulley 45, while its smooth side engages the idler pulley 52.

Desirably, the upper portion 55ᵐ of the stub shaft 55 (Figs. 4 and 5) on which the pulley 57 is mounted is rotatable, relatively to the lower part of the shaft 55 and shaped to provide an eccentric bearing for the pulley 57, whereby the axis of the latter may be shifted relatively to that of the shaft 55, thereby to adjust the tension of the upper belt relatively to that of the lower belt.

Fig. 2 illustrates a preferred relation of the bottle to the spacer screw 23 and to the belts while the bottle is passing through the spotting zone. The speed of the conveyor 22 (Fig. 1) relatively to the pitch and direction of rotation of the screw 23 is such that the latter always tends to retard travel of the bottle, so that the contact point C of the bottle with the screw is always at the forward end of the helical groove in the screw, while the pressure exerted by the belts is such as to create another point of contact at D. The screw must be so designed that the bottles are spaced apart, as indicated at E (Fig. 2), to provide clearance between the spotting projection S on adjacent bottles as the bottles are rotated; and, the part F of the screw must be so elevated above the plane of the bottom of the bottle, as the latter rests on the conveyor, as to avoid contact of the spotting projection with this part of the screw.

Assuming that the lower belt is driven at the same linear velocity as the conveyor and in the same direction, a bottle B¹ (Fig. 2) entering at the left-hand side of the apparatus, as indicated in Fig. 2, will be brought into contact with the screw thread at the point C¹, and will be carried forward at the rate permitted by the screw until its periphery contacts the upper belt 80 (Fig. 6). As the surface speed of this belt is less than that of the conveyor or, as above suggested, the belt be actually stationary, the frictional contact of the belt with the periphery of the advancing bottle will tend to turn the bottle in a counterclockwise direction, as indicated in Fig. 2, until eventually, in its revolution, the spotting projection S will be engaged by one of the lugs or teeth 81 on the lower belt 82. Although this belt 82 is moving at the same speed as the conveyor 22, the feed screw will not permit the bottle to advance at conveyor speed until said bottle has arrived at that point on the feed screw where final spacing of the bottle begins. Let it be assumed that this point is occupied by the third bottle from the right in Figure 2 of the drawings and that from this point said bottle will travel at conveyor speed. It will be understood that spotting element S' may be engaged by a lug 81 on belt 82 at any time after the bottle contacts the smooth belt 80, the latter causing said bottle to rotate. The fact that belt 82 is traveling faster than the bottle will cause lug 81 to move ahead of spotting element S' whereby a succeeding lug 81 will come into action and tend to keep the bottle from turning about its vertical axis. This sort of action may occur several times until the bottle reaches that point referred to above, where said bottle, the belt 82 and conveyor 22 will all travel at the same speed. From this point, there is some slight cause for relative motion between projection S' and lug 81 because smooth belt 80 is still tending to turn the bottle about its vertical axis. However, this frictional contact is insufficient to cause element S' to break contact with lug 81 so the bottle remains accurately spotted. As shown in Figure 20 of the drawing, it is common practice to contact the top of a bottle by hold-down means as said bottle is about to leave the spotting zone to be further processed, for example, as by the application of a label to the predetermined area thereof obtained by spotting.

A modification of the above apparatus will now be described which may be used for having spotting projection S, as above described, as well as those spotting articles wherein the spotting element is of the depressed bar type, that is, it is the end wall of a recess in the surface of the article, so that said element lies within the periphery of the article, instead of projecting outwardly from said periphery. In general, this modification is like the above-described apparatus, except as respects the substitution of a link chain for the lower belt of the first-described arrangement, said chain carrying specially designed parts for engagement with a depressed spotting element and with the addition of certain parts especially designed for driving and maintaining the chain, which carries said parts, under proper tension during the operation.

In Figs. 9, 10 and 11, portions of a bottle provided with a spotting element of the kind just above referred to are diagrammatically shown. Thus, in Fig. 9, the surface of the bottle is shown in elevation and as having a pair of recesses or depressions separated by a centrally located bar or island 91. As shown in Fig. 10, the depth of each depression is only a fraction of the thickness of the wall of the bottle and the bar or island 91 has flat surfaces 92 and 93 at opposite sides which are preferably slightly convergent outwardly and each of which makes an angle of the order of 120° with a tangent to the surface of the bottle at the outer edge of the respective side surfaces 92 and 93; however, this angle is cited merely by way of illustration and not by way of limitation. The surfaces 92 and 93 constitute spotting elements in a bottle of this type and, for cooperation with these spotting elements, especially designed parts, hereinafter referred to as "pawls" are provided. Referring to Fig. 11, each of these pawls P comprises a hub portion 94 having a transverse bore for the reception of a pivot pin 103 and two divergent rigid arms 96 and 97. The arm 96 is provided with a flat end face 98 which is disposed at an angle such (assuming the axis of the pivot 103 of the pawl is at the proper distance from the axis of the bottle) that said surface 98 may contact substantially the entire area of the spotting element 93, for example, of the bottle, thus insuring a firm, non-slipping engagement of the arm 96 with the spotting element.

The arm 96 of each pawl P (Fig. 11) has a notch N which receives one arm of a hairpin spring S²; the other arm of which is housed in a slot F in the hub of the next adjacent pawl. The spring tends so to swing the pawl as to cause the end 98 of the arm 96 to enter the recess 90 in the surface of the bottle and to engage the spotting element 93. The other arm 97 of the pawl has an arcuate surface 98ª which, by contact with the hub of the next adjacent pawl, limits motion of the arm 96 toward the bottle. The provision of the spring and the angle of the spotting element, as above described, permits the arm 96 to disengage the bottle if the latter offer undue resistance to turning, thus avoiding damage to the parts.

The pawls are mounted on an endless flexible carrier 100 (Fig. 12) which is made up of two conventional roller chains 101 and 102 (Fig. 8) united by the pivot pins 103, each passing through the bore of one of the pawls P and forming the pivot about which the pawl may rock. Since it is essential that the pawls be accurately located in a horizontal plane such that their ends 98 (Fig. 11) may, without fail, engage one of the spotting elements (which are of very limited vertical extent), a rigid horizontal steel bar 104 (Fig. 8) is so supported by the frame of the spotting device that it extends along that side of the conveyor path which is opposite to the screw 23 and at a height such that a horizontal plane mid-way between the upper and lower surfaces of the bar will substantially bisect the spotting element on a bottle standing on the conveyor. Nylon wear plates 105 and 106 (Fig. 8) are arranged to contact the upper and lower surfaces of the bar 104, these plates projecting outwardly (beyond that edge of the bar which is adjacent to the conveyor path) a distance such that, when the edges of the nylon wear plates are contacted by the rollers on the pins 103 on which the pawls are pivoted, the ends 98 of the pawls will be properly located for contact with the spotting elements of the bottles. As will be noted in Fig. 8, the upper flanges of the chain rollers ride upon the upper surfaces of the nylon wear plates, thus supporting the pawls accurately in the proper horizontal plane relative to the spotting elements on the bottles.

Above the pawl-carrying chain, there is an endless belt 107 (Fig. 8) which, by frictional contact with the periphery of the bottle, causes the latter to rotate. The means for driving and guiding the belt 107 is substantially identical with that above described for driving the top belt 80, but since, in the modified arrangement, the chain is supported by the bar 104 with its nylon wear plates, no guide pulleys (like the lower guide pulleys 71, 73, etc. of the above-described apparatus) are necessary. In the modified device, a chain-driving sprocket wheel 45ª (Fig. 14) is substituted for the drive pulley 45 of the earlier arrangement, and idler sprockets 58ª and 60ª (Fig. 15) are substituted for corresponding idler pulleys 58 and 60 of the earlier arrangement.

The endless chain 100 embraces these idler sprockets 58ª and 60ª (Fig. 16) located beyond the opposite ends of the supporting bar 104 and extends between these idler rolls in a straight run (parallel to the conveyor path) which is supported by the bar 104 (Figs. 8 and 16), referred to above. At the outer side of the spotting device, the chain passes from the idler sprocket 60ª to the driving sprocket 45ª (Figs. 14 and 15) which, as above suggested, is substituted for the driving pulley 45 of the first-described arrangement. The sprocket 45ª may be driven in the same way (Fig. 14) as the pulley 45 from the main shaft.

However, for properly timing the chain 100, with reference to the spacer screw 23, the arrangement shown in Figs. 14 and 14ª is preferred over that shown in Fig. 3. In such an arrangement as that of Fig. 14, the sprocket 40 may be keyed to a shaft 39ˣ coaxial with the shaft 39, and between these shafts 39ˣ and 39, a clutch is interposed. This clutch, as here illustrated (Figs. 14 and 14ª), comprises disc-like parts 206 and 207, the first being fixed to the shaft 39, for example, by a key, and the second being secured to the shaft 39ˣ by a key and set screw so that it may be moved away from the part 206 when desired. The parts 206 and 207 have opposed faces, each provided with a circular series of spaced teeth (Fig. 14ª) so shaped that the teeth of one of said parts may project into the spaces between the teeth of the other part and thus provide positive drive from part 207 to part 206. By backing off the set screw, the clutch element 207 may be disengaged from the element 206, allowing the shaft 39 to be rotated relatively to the shaft 39ˣ. By way of example, the teeth of the clutch members are so designed that rotation of part 206, relatively to part 207, by the width of one tooth, will correspond to an advance of the chain 100 such that the pivot 103 of the spotting pawl moves a distance of 0.050 inch relatively to the spacer screw; such motion of the chain may be either in the forward or reverse direction, so that by this means it is possible to obtain a very accurate relative timing of the chain and spacer screw. When the parts have been properly adjusted, the clutch elements are again engaged and the set screw tightened.

After passing about the driving sprocket 45$^a$, the chain passes about an idler take-up sprocket 52$^x$ (Figs. 16, 18 and 19) and thence to the idler sprocket 58$^a$ (Fig. 15) at the opposite end of the apparatus. The take-up sprocket 52$^x$ is free to turn on a shaft 108 (Figs. 17 and 18) carried by the frame of the spotting device. The lower end of this shaft 108 is reduced in diameter and turns in a bearing socket in a plate 109 supported by and bolted to the part 32 of the spotting device. Elongate slots 110 (Fig. 19) in this plate provide for bodily movement of the plate toward and from the conveyor path for slackening or tightening the chain. A slot 111 in the upper frame member 32$^m$ permits such motion of the shaft. At the upper part of the shaft, a bolt 112, having a coiled spring G bearing against its head, is threaded through the shaft to provide for chain adjustment, and a set screw 113 (Fig. 18) holds the parts in adjusted position. As above described, the belt 107 is driven in the same manner as the belt 82 of the first-described arrangement.

Referring to Figs. 20, 21 and 22, the neck-guiding bar 34 has an edge 34$^x$ (Fig. 22) which is so located that, by contact with a bottle neck N$^1$, it tends to tip the bottle axis slightly toward the spacer screw 23, so that the bottom of the bottle will bear against that side of the conveyor which is adjacent to the screw. This reduces friction and facilitates rotation of the bottle as the latter passes through the orienting zone where the conveyor is traveling faster than the bottle. However, the neck-engaging bar 34 is reduced in width or relieved above the delivery end portion of the screw to provide a portion 34$^y$, so located as to allow a bottle neck N$^2$ to resume the vertical. To assure such positioning of the bottle, and in order that the bottle may be accurately positioned as it approaches the hold-down device H, a resilient guide (Figs. 20, 21 and 22) is provided. This guide, as here shown, is a hairpin spring having the leg 210, which extends substantially parallel to the conveyor path, and which is located opposite to the edge 34$^y$ of guide 34 so as, by contact with the bottle neck, to force the bottle up into vertical position. This leg 210 is connected by a coil 211 (Fig. 20) to a leg 212, which is adjustably clamped to a bracket 213 (Fig. 21) which is fixed to the frame of the spotting device. This spring is so adjusted that its leg 210, by contact with the bottle neck, centers the bottle transversely of the conveyor. This spring has an added value in that the friction exerted by the leg upon the advancing bottle acts with a retarding effect to straighten up a bottle, which may have assumed a forwardly leaning position due to the pitch of the spacer screw and its angle of contact with bottles of different shapes or sizes. This spring may be adjusted to assure the verticality of the bottle just prior to its delivery by the spacer screw to the hold-down device H.

The operation of the modified apparatus, just above described, is like that of the first arrangement except that, in the modified device, the pawl P, carried by the chain 100, performs the same function as a lug 81, carried by the belt 82, and with respect to a depressed spotting element instead of a projecting tear-drop type of spotting element.

The spotting device, as above described, with its frame and the parts mounted thereon, is a self-contained unit which may be quickly applied to the conveyor apparatus with which it is associated and which may as quickly be removed simply by removing the driving chain and the bolts 29$^a$ which attach the brackets 29 to the table. It may also be noted that, while a certain spacing of the articles has herein been illustrated by way of example, the only change that is required to vary the spacing of the articles is the substitution of a feed screw of different pitch.

While certain desirable embodiments of the invention have herein been described and illustrated by way of example, it is to be understood that the invention is broadly inclusive of any and all modifications falling within the scope of the appended claims.

I claim:

1. In combination, in apparatus of the kind wherein articles, each provided with a spotting element, are moved along a predetermined path by conveyor means and wherein a rigid, rotating spacer screw is arranged at one side of the article path, and which includes means for turning the screw at a predetermined angular velocity, spotting means at the opposite side of the conveyor path from the spacer screw, said spotting means being operative to orient an article while the latter is in engagement with the spacer screw.

2. The combination, according to claim 1, wherein the spotting means includes means operative to terminate rotation of the article when the spotting element is on a radius of the article which makes a predetermined angle with the central line of the conveyor path.

3. The combination, according to claim 1, wherein the spotting means comprises an endless, flexible carrier having a substantially rectilinear run located at the opposite side of the article path from the spacer screw, means for moving the carrier in the same direction as the conveyor means, means for turning each article about its own axis while it is in the field of action of the spacer screw, and spaced stop members carried by the endless carrier, each respective stop member being operative, by engagement with the spotting element of the article, to terminate rotation of said article about its own axis when its spotting element is on a radius of the article which makes a predetermined angle with the center line of the conveyor path.

4. Apparatus, according to claim 3, having means operative to drive the spacer screw and the endless carrier at such predetermined relative linear velocities that the screw tends to retard advance of the article.

5. Apparatus, according to claim 3, wherein the spacer screw is of a pitch such as to provide clearance between adjacent articles sufficient to avoid contact of a spotting projection on one article with the next adjacent article.

6. Apparatus, according to claim 3, wherein the spacer screw is of a pitch and root diameter such that the periphery of the article contacts the screw at two spaced points.

7. Apparatus, according to claim 3, wherein the axis of the spacer screw is in a horizontal plane so spaced above that of the conveyor path as to prevent contact of a spotting projection on the article with the spacer screw.

8. Apparatus, according to claim 3, including means operative to maintain the aforesaid substantially rectilinear run of the endless, flexible carrier in a path such that the stop means moves in the horizontal plane of motion of the spotting elements of the articles.

9. Apparatus, according to claim 3, including means operative to maintain the aforesaid rectilinear run of the flexible, endless carrier at a predetermined radial distance from a plane defined by the vertical axes of the articles as they move along the conveyor path.

10. Apparatus, according to claim 3, wherein the means for turning the article about its own axis is an endless belt, and having means for moving the endless flexible carrier and the belt at different linear velocities.

11. Apparatus, according to claim 3, having means operative resiliently to urge the aforesaid rectilinear run of the endless carrier toward the article path thereby to insure contact of the stop members with the spotting elements of the articles.

12. Apparatus, according to claim 3, having means operative to apply tension to said endless flexible carrier.

13. Apparatus, according to claim 3, wherein the means for turning the article about its own axis comprises a part parallel to the conveyor path and which has a smooth surface which makes frictional contact with the periphery of the article as the latter moves along the conveyor path.

14. Apparatus, according to claim 3, wherein the means for turning the article about its own axis comprises an endless belt having a rectilinear run which is substantially parallel to the conveyor path and which has a smooth surface which makes frictional contact with the periphery of the article as the latter moves along the conveyor path.

15. Apparatus, according to claim 14, having means for driving the belt at a linear velocity substantially less than that of the endless carrier and the conveyor.

16. Apparatus, according to claim 4, wherein the means for turning each article about its own axis is an endless belt, one face of which is smooth and whose opposite face is provided with teeth, and having a driving sprocket wheel which engages said teeth and moves the belt at a predetermined velocity.

17. The combination, according to claim 3, for use with an article having a projection constituting the spotting element and the carrier is an endless belt, means guiding said belt to provide a rectilinear run parallel to the article path and at the opposite side of the article path from the spacer screw, said belt having uniformly spaced lugs, constituting the rotation terminating means, on that surface which is opposed to the carrier path, and means for moving said run of the belt and the conveyor in the same direction and at the same linear velocity.

18. The combination, according to claim 3, for use with an article having a projection constituting the spotting element and the carrier is an endless belt, means guiding the belt to form a substantially rectilinear run parallel to the conveyor path and at the opposite side of said path from the spacing screw, said belt having uniformly spaced lugs constituting rotation-terminating means for engagement with the spotting elements of the articles, and the means for rotating each article about its own vertical axis comprises a second endless belt having a rectilinear run in the same vertical plane with the aforesaid run of the carrier belt and having a smooth surface for frictional engagement with the peripheries of the articles, and means for moving the article-turning belt oppositely to the carrier belt.

19. Apparatus, according to claim 3, for use with an article whose spotting element is the wall of a depression in the surface of the article; the flexible carrier is an endless, link chain; and the rotation-stopping member is a part carried by the chain and which is shaped to enter the depression in the article and to contact said wall of the depression.

20. Apparatus, according to claim 3, wherein the endless, flexible carrier is a link chain, and the stop member is a pawl pivotally attached to the chain and having an end designed to enter the depression in the article and to contact the wall of the depression, and spring means tending to hold the pawl in article-engaging position.

21. Spotting apparatus according to claim 4 for use in spotting a circular article having a spotting element which is a wall of a depression in the surface of the article, and having means which makes frictional contact with the periphery of the article thereby to turn the article in a direction such that said wall of the depression faces in the direction of rotation, and wherein the carrier moves in a path parallel to a tangent to the periphery of the article, the stop members being pivoted to said carrier and each having an arm provided with a surface designed to contact said wall of the depression in the article, and means yieldingly urging said arm in a direction to engage it in said wall of said depression.

22. The combination, according to claim 21, wherein the parts are so constructed and arranged that said wall of the depression in the article moves substantially opposite to the direction of motion of the carrier as said wall nears its point of closest approach to the path of the carrier.

23. The combination, according to claim 21, wherein each stop member is a two-armed pawl pivoted to the carrier, one arm having an end surface designed to engage said wall in the cavity of the article, a spring urging the pawl to turn so as to position said last-named arm for engagement with said wall, and means engageable with the other arm of the pawl to limit such turning motion.

24. The combination, according to claim 21 wherein the carrier is in endless, link chain, and wherein a pawl is associated with each chain link, each pawl comprising a hub portion and two divergent arms, pivoting means connecting the hub of each pawl to its corresponding chain link, one arm of each pawl being shaped for engagement with the wall of the cavity in the article thereby to form a stop member positively to terminate rotation of the article about its own axis, a spring tending to turn each pawl about its pivot thereby to place the last-named arm of the pawl in position to engage the wall of the cavity in the article and the other arm of each pawl being so constructed and arranged as by contact with the hub of an adjacent pawl to limit such turning motion of the pawl in response to its spring.

25. Article-orienting means for use in apparatus of the kind wherein articles, each provided with a spotting element, are advanced uninterruptedly while resting upon a moving conveyor and having a rotating spacer screw arranged at one side of the article path with its axis parallel to said path, in combination, an endless, flexible carrier having one substantially rectilinear run which is arranged adjacent to the conveyor path and at the opposite side of said path from the screw, and having means which moves said run in the same direction as the conveyor, uniformly spaced stop members mounted on said flexible carrier, each designed, by engagement by a spotting element of an article, to terminate rotation of said article about its vertical axis, and means for applying frictional force to the articles as they move along the conveyor path such as to tend to rotate each article about its vertical axis in a direction to cause its spotting element to approach the aforesaid carrier run while moving oppositely to the stop members mounted on the latter.

26. The combination, according to claim 25, having means whereby the stop members and the conveyor are moved along parallel paths at the same linear velocity and in the same direction.

27. An article-spotting device for use with conveyor apparatus having a frame which supports a conveyor for moving articles along a predetermined path and which has a rotary spacer screw whose axis is parallel to said path for spacing articles a predetermined distance apart as they advance along said path, said spotting device comprising a frame, means carried by the latter frame for rotating an article about its vertical axis as it advances along said path, means also carried by the latter frame engageable with a spotting element on the article to terminate rotation of the article when its spotting element is in a predetermined radial plane of the article, and means for removably attaching the spotting device as a unit to the frame of the conveyor apparatus.

28. In combination, in apparatus of the kind wherein a frame supports conveyor means operative to move articles, each having a spotting element, uninterruptedly along a predetermined, rectilinear path, a rotating article-spacing screw having its axis at one side of and parallel to said path, and means for driving the conveyor means and screw at predetermined relative speeds, a spotting unit provided with means for rotating each article about its own vertical axis, means cooperable with the spotting element of an article for terminating such rotation of the article when the spotting element lies on a radius of the article which makes a predetermined angle with the center line of the conveyor path, and means for removably attaching said unit to the frame of the conveyor apparatus in position such that the article-rotating means is operative to turn an article while the latter is engaged by the spacer screw.

29. The combination, according to claim 28, wherein the means for attaching the spotting unit to the machine frame is so constructed and arranged that the article-turning means may be adjusted toward or from the spacer screw to accommodate articles of different diameters.

30. In combination, in apparatus of the kind wherein articles, each provided with a spotting element, are moved along a predetermined path by conveyor means, and wherein a rigid rotating spacer screw is arranged at one side of the article path, and which includes means for turning the screw at a predetermined angular velocity, spotting means which is operative to orient an article while the latter is in engagement with the spacer screw, the spotting means comprising an endless flexible carrier having a substantially rectilinear run located at the opposite side of the article path from the spacer screw, means for moving the carrier in the same direction as the conveyor means, means for turning each article about its own axis while it is in the field of action of the spacer screw, and spaced stop members mounted on the endless carrier, and any of which is engageable with the spotting element of an article to terminate rotation of said article about its own axis when its spotting elemen is on a radius of the article which makes a predetermined angle with the center line of the conveyor path, and adjusting means whereby the endless carrier and the spacer screw may be accurately timed.

31. The combination, according to claim 30, including a main shaft and means for transmitting motion from the main shaft to the endless carrier and to the screw, further characterized in that the motion-transmitting means includes normally engaging, driving and driven rotary elements, and means whereby said elements may be temporarily disengaged to permit the endless carrier to be moved relatively to the screw to bring them into accurately timed relation.

32. The combination, according to claim 31, wherein said driving and driven elements are coaxial discs having circular series of spaced interengageable clutch elements which, when engaged, positively prevent relative rotation of said discs, the constituent clutch elements of said circular series being spaced apart circumferentially a distance which bears a predetermined definite relation to the spacing of the stop members on the endless carrier.

33. Spotting apparatus according to claim 4 for use in spotting bottles and wherein the flexible carrier is an endless link chain and the stop members are pivotally connected to and carried by the chain.

34. The combination, according to claim 33, wherein a spring tends to hold the pivoted stop members in bottle engaging position, but permits the stop element to retreat from the conveyor path in response to abnormal resistance offered by the bottle.

35. The combination, according to claim 33, wherein each stop member is a pawl pivotally attached to a link of the chain, each pawl comprising an arm whose free end is engageable with the spotting element of the bottle, and spring means tending to hold the pawl in position such that the end of said arm will engage the spotting element of a bottle and thereby terminate rotation of the latter about its own axis.

36. The combination, according to claim 33, wherein each stop member is a rigid, two-armed pawl pivoted to a link of the carrier, one arm having an end surface designed to engage the spotting element of the bottle, a spring urging the pawl to turn toward a position such that said end surface of the arm may engage the spotting ele- ment on the bottle, and means engageable with the other arm of the pawl to limit movement of the pawl by the spring.

37. Spotting apparatus according to claim 4 wherein the flexible carrier is an endless link chain, a pawl associated with each chain link, each pawl comprising a hub portion and two divergent arms, pivot means connecting the hub of each pawl to its corresponding chain link, one arm of each pawl being shaped for engagement with the spotting element of the article, thereby to terminate rotation of the article about its vertical axis, a spring tending to turn each pawl about its pivot, thereby to place the last-named arm of the pawl in position to engage the spotting element of an article as the latter moves along the conveyor path, and means operative, by contact with the other arm of the pawl, to limit turning motion of the pawl in response to the spring.

38. The combination, according to claim 3, further characterized in having means operative to tilt the article while it is in the orienting zone, so that its bottom surface bears only upon that side of the conveyor which is adjacent to the screw, thereby to facilitate rotation of the article.

39. The combination, according to claim 38, wherein the article having the spotting element is a bottle having a body portion and a neck, and the means for tilting the bottle is a fixed rigid guide having an elongate edge which is so located as to contact the neck of the bottle as the latter moves along the conveyor path.

40. The combination, according to claim 39, wherein that part of the article-contacting edge of the guide, which is above the delivery end portion of the screw, is relieved thereby to permit the axis of the bottle to return to the vertical.

41. The combination, according to claim 3, wherein the article having the spotting element is a bottle having a body portion and a neck, further characterized in having means engageable with the bottle neck, as the bottle approaches the delivery end of the screw, for creating a retarding force such as to rock the bottle back to the vertical if it is leaning forwardly in the direction of conveyor movement.

42. The combination, according to claim 41, wherein the means for creating the retarding force comprises a hairpin spring having divergent legs, one of which is arranged substantially parallel to the conveyor path and which is so located as to apply frictional drag to the bottle neck as the bottle moves along, and means adjustably supporting the other leg of the spring.

43. The combination, according to claim 3, wherein the article having the spotting element is a bottle provided with a body and a neck, and wherein hold-down means is arranged to engage the top of the bottle neck as the bottle moves out of engagement with the screw, further characterized in having means operative to insure verticality of the bottle axis as the bottle approaches the hold-down means.

44. The combination, according to claim 3, wherein the article having the spotting element is a bottle provided with a body and a neck, and wherein hold-down means is arranged to engage the top of the bottle neck as the latter advances after leaving the screw, further characterized in having means operative to center the axis of the bottle transversely of the conveyor as the bottle approaches the hold-down means.

References Cited in the file of this patent

UNITED STATES PATENTS

| | | |
|---|---|---|
| 1,116,523 | Westlake | Nov. 10, 1914 |
| 2,293,553 | Magnusson | Aug. 18, 1942 |
| 2,543,142 | Wehmiller | Feb. 27, 1951 |
| 2,706,031 | Capstack | Apr. 12, 1955 |
| 2,825,442 | Carter | Mar. 4, 1958 |